Feb. 23, 1965 S. OESTREICHER 3,170,845
NUCLEAR REACTOR CONTROL SYSTEM
Original Filed Feb. 17, 1955 5 Sheets-Sheet 3

INVENTOR.
SEYMOUR OESTREICHER
BY
*William A. Drucker*
ATTORNEY

Feb. 23, 1965 S. OESTREICHER 3,170,845
NUCLEAR REACTOR CONTROL SYSTEM
Original Filed Feb. 17, 1955 5 Sheets-Sheet 4

FIG. 4

INVENTOR.
SEYMOUR OESTREICHER
BY
William A. Drucker
ATTORNEY

United States Patent Office

3,170,845
Patented Feb. 23, 1965

3,170,845
NUCLEAR REACTOR CONTROL SYSTEM
Seymour Oestreicher, Mineola, N.Y., assignor to American Machine & Foundry Company, a corporation of New Jersey
Continuation of application Ser. No. 488,808, Feb. 17, 1955. This application Nov. 29, 1961, Ser. No. 155,554
9 Claims. (Cl. 176—36)

This invention relates to improvements in the control of nuclear reactions. More particularly, the invention relates to a novel system of control rods and control rod driving means interchangeably mounted about a reactor core.

This application is a continuation of my copending application Serial No. 488,808, now abandoned, filed February 17, 1955, and entitled Nuclear Reactor Control System.

In the operation of a nuclear reactor, neutron absorbing control rods, acting as adjustable brakes on the intensity of nuclear fission chain reaction, are moved in channels through a reactor core of fuel elements containing fissionable material by driving mechanisms mounted outside of the reactor core. Reactors are conventionally designed for particular operations and use is limited to those operations originally intended except where expensive and difficult changes in structure are made. Control rods and associated driving means are built to critical specifications depending precisely upon the use, neutron flux distribution, and power level for which a reactor is designed. When a different pattern of neutron flux is needed in the reactor core for experimental purposes, for example, the location, pattern and number of control rods must be changed. Likewise, when a larger reaction is contemplated than the reactor is designed to accommodate, an independent reactor must be built or major structural modifications undertaken. This operation is awkward as it conventionally requires costly welding and cutting operations, often on radioactive material, and involving substantially a complete redesign and rebuilding of the reactor. This inefficient method of building reactors may alternatively require an expensive series of different reactors to perform different kinds of operations.

Accordingly, one object of the present invention is to provide a flexible reactor and reactor control system which eliminates the need for building several different kinds of reactors to accommodate different fuel loads.

Another object of the present invention is to provide a flexible reactor provided with a novel flexible system of controls wherein different control rod loads and speeds can be controlled by a control rod driving mechanism characterized by interchangeable gears and motors of various sizes.

A further object of this invention is to provide for the accommodation within a given nuclear reactor of varying numbers of control rods, control rod driving mechanisms and fuel elements in relation to the size and kind of nuclear reaction to be controlled. Such controls can be selectively mounted and arranged in any of several different positions around an adjustable reactor core of fissionable material and individual controls and fuel elements can easily be added to or removed from the system.

Another object is to provide a novel method of controlling nuclear reactions.

The present invention comprises a nuclear reactor core through which control rods are moved by control rod driving means. This invention embraces the interchangeable use and adjustment of one or more control rods and auxiliary driving mechanisms, in conjunction with a number of fuel elements, to adjust the capacity of the entire system or change its operating characteristics.

An advantage of this invention is that the number and type of driving mechanisms can be selected according to the size of the reaction which must be controlled. Moreover, the invention includes the adaptable distribution of control rods in different spaced relationships to one another and to the reactor core depending upon the particular reaction contemplated. These relationships must be separately computed for each size or kind of reaction and when known, by relatively simple changes, either the control rods or the fuel elements or both in combination, can be readily varied to satisfy the new requirements of the reactor.

Another advantage of this invention is that different kinds of control rod driving mechanisms may be selected, based upon the interchangeability of parts, including motors and gears within the control rod driving mechanism assembly, so that control rods can be driven at varying speeds, with varying degrees of precise control, and to carry different power loads. Concomitant interchangeable reactor instrumentation and core structure complete the complement of novel interchangeable features of this invention.

The foregoing objects and advantages will be realized and the invention will be more fully described by reference to the accompanying drawing.

Similar reference characters are applied to similar elements throughout the drawing.

FIGURE 1 is a perspective view of a swimming pool type nuclear reactor upon which is mounted a movable bridge and core support, parts being shown broken away to reveal details of the apparatus.

FIGURE 2 is a detail view of a heterogeneous reactor core mounted on a grid plate in a swimming pool type reactor and showing the mounted core channels of special hollow fuel elements which provide openings in the core in which control rods move to meet any condition of operation desired. These special elements are readily mounted in any selected position on the grid plate to receive control rods whose lateral location is determined by the drive mechanism mounting shown in FIGURE 3.

FIGURE 4 is a partially exploded view of a preferred form of components of a control rod driving mechanism.

A unitized reactor may be built according to this invention in many forms. Heterogeneous reactors such as the Bulk Shielding Facility or swimming pool, as well as the homogeneous or water boiler type reactor may be equally improved by design according to this invention.

Figure 1:
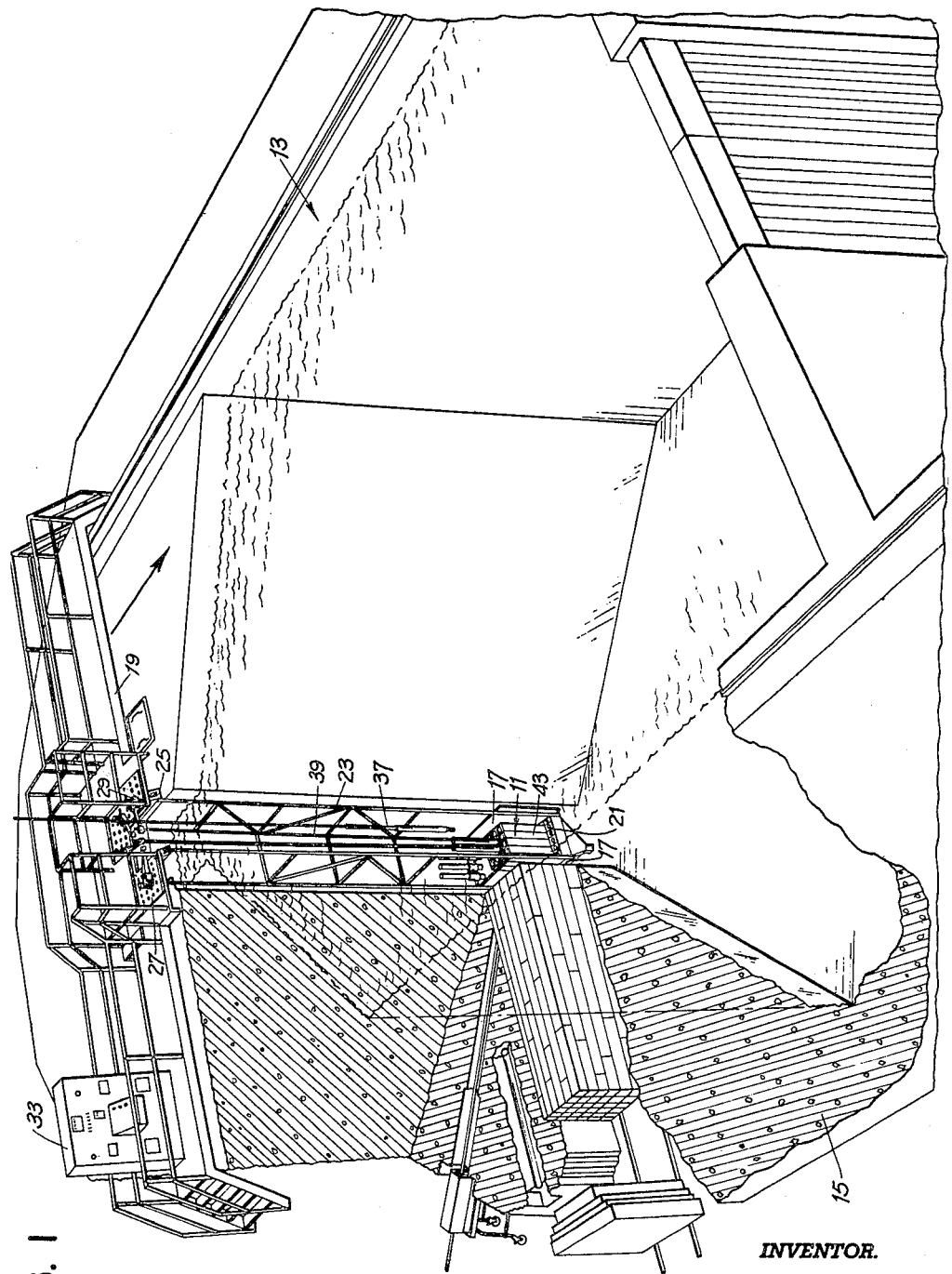

In a preferred embodiment of the invention, as illustrated in FIGURE 1, there is shown a Bulk Shielding Facility type or "swimming pool" reactor, designed to perform large shielding experiments. In this construction, the reactor core 11 is suspended in a pool 13 which contains water in which radiation shielding can be set up for tests. In FIGURE 1 it is clear that parts shown broken away to reveal structural detail ordinarily serve to contain the water. The water serves as a neutron reflector, a moderator, a coolant, and as shielding. The first step in the construction of a swimming pool, therefore, is to pour concrete 15 to form a supporting framework with suitable experimental windowed openings 17. Next, the pool is spanned by a movable bridge structure 19. The core 11 is then suspended from the bridge 19 a suitable distance, for example twenty feet, below the surface of the water on a grid plate 21 by a suspension truss 23 which slips onto mountings 25 on the bridge 19. This detail appears in FIGURE 2.

Figure 2:
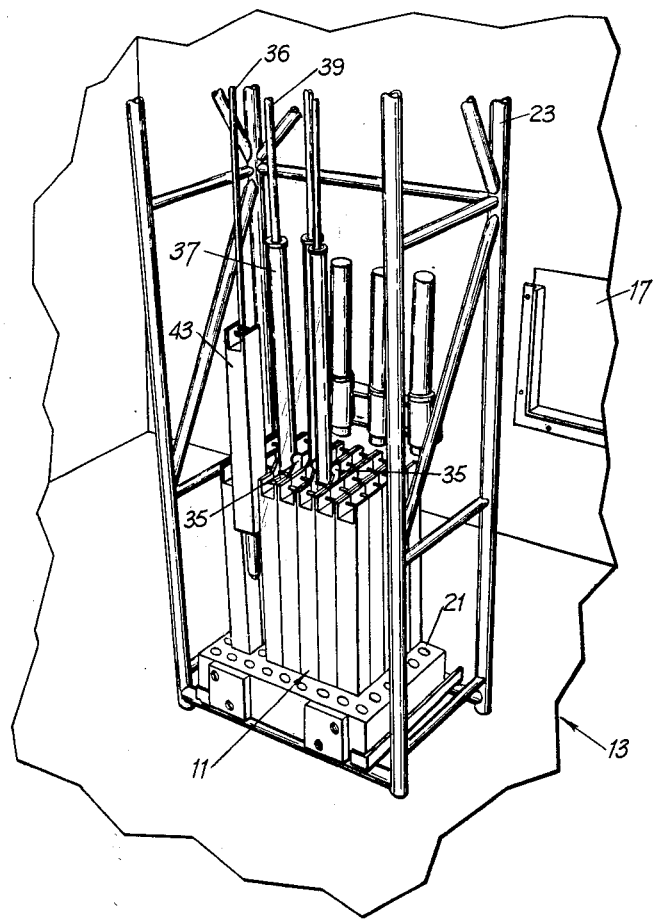
Figure 3:
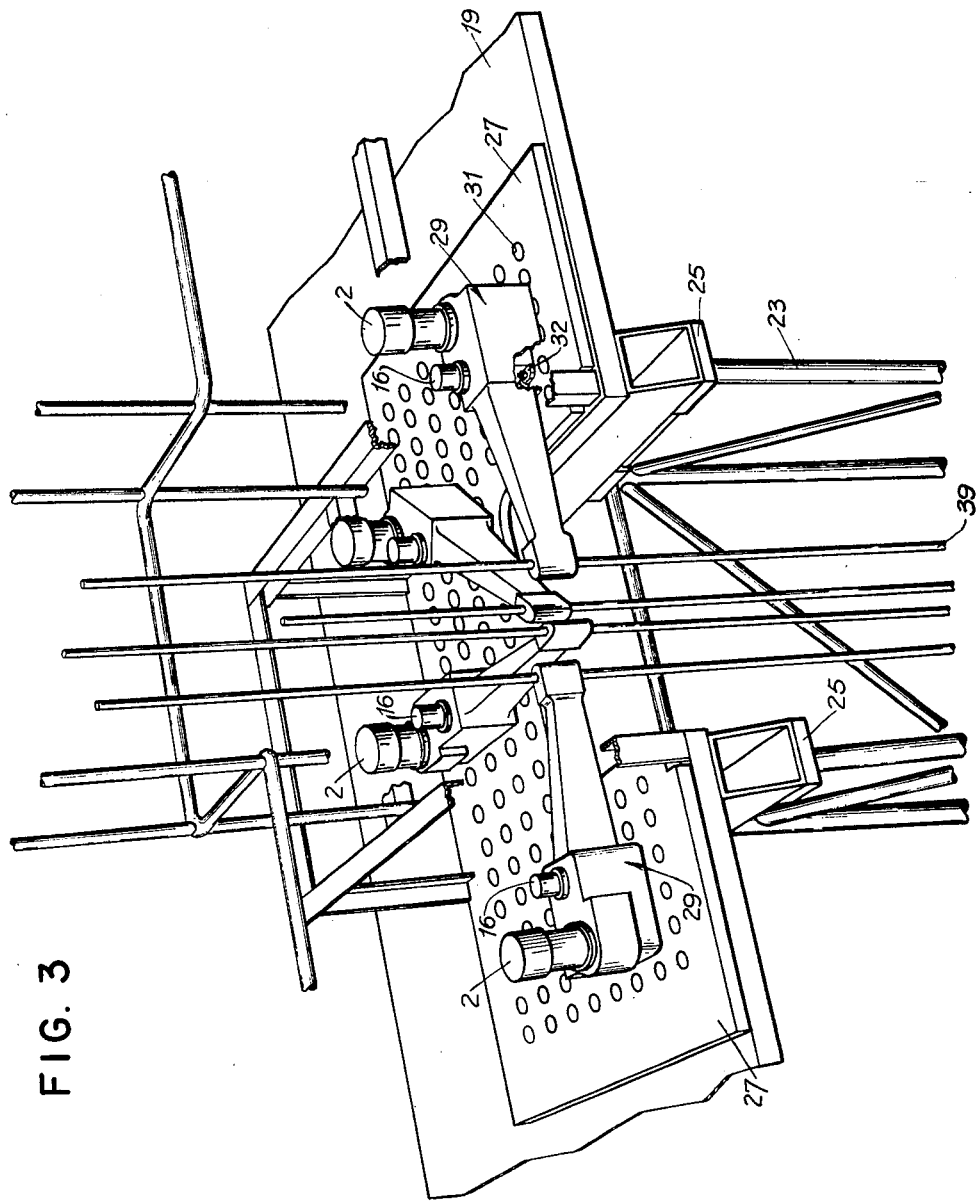
FIGURE 3 is a view of four control rod driving mechanisms selectively positioned on a perforate mounting board which acts as a supporting member with several mounting stations.

In the form shown in FIGURES 1 and 3, mounting plate 27, already bored for mounting control rods and associated drive mechanisms, is inserted and suitably secured or locked into place at the top of the suspension structure 23. This plate is shown in detail in FIGURE 3. A grid plate or support 21, shown in FIGURE 2, is used for mounting fuel elements 41.

FIGURE 4, which is an exploded view of a preferred embodiment of the motor package 29, or control rod driving mechanism, shows the basic housings with various interchangeable units.

The control rod drive includes: motors 2; main transmission unit with adapters 5; worm reducer unit 6; coverplate 8; shim drive transmission 10; magnetic clutch 12; regulating drive transmission 14; position transducers 16, such as potentiometers or synchro generators; main drive shaft 20; rod guide housing 22; limit switch 24; switch actuator 26; driven rack 28; linear bearing 30; and pinion 34.

The motor packages 29 bolt at flanges or mounting pads 32 onto standard anchorages 31, as shown in FIGURE 3, and are mounted on the bridge 19. All electrical connections from the motor packages 29, including those from the position pickoffs or position transducers 16, such as potentiometers or synchro generators, limit switches, magnet and motor 2, for example, terminate in a suitable junction box (not shown) on the motor package mounting plate 27.

A control console 33 containing all the required standard nuclear measuring instruments can be mounted on the bridge 19, as shown in FIGURE 1, or in a separate control room. The controls for the motor package 29 are plug-in units, although other types, such as screw-in kinds, also work. Each unit contains control switches, limit lights, position indicator and indicator drive. The console has been prewired and tested. Plugging in control units and connecting to added motor packages are the steps necessary to connect them in operating order in the reactor operating and control system.

To load the reactor special hollow fuel elements 35, containing control rods (not shown) and removable guide rods 37, are lowered into position below the motor packages and attached to the grid plate, FIGURE 2. The control rods are affixed to elongated rack driven supports 39. Once the elements 35 and guides 37 are in place, drive racks 28, extension and magnetic clutches 12 are connected (not shown). Fuel elements 41 are inserted. The reactor is now ready for standard start up procedure. All components, including handling tools 36, used in this assembly are standard unit components for which spare parts are easily kept in supply.

For a contemplated power level of 100 kilowatts and a flux density of $10^{12}$n/cm.$^2$/sec. for example, three rods are required, two shim-safety rods (coarse control), and one regulating rod (fine control). If an operation is scheduled which requires a fuel loading greater than was anticipated at the initial construction of the facility, then three rods may not be enough for safe operation and changes may have to be made. The unitized assembly has been designed for such contingencies. Another shim safety rod can be added quickly and conveniently with no major changes in the system. A blank in the instrument console 33 is removed, revealing prewired connections. A standard control unit is inserted. A standard motor package unit 29 is bolted into its predrilled location and the drive rack 28 and magnetic clutch 12 are inserted. The normal fuel elements 43 directly below are removed and replaced with the hollow special element 35 and guide rod 37. Electrical connections are made for the fourth rod drive and additional fuel is loaded. The reactor can now accommodate the new experiment and operate with requisite safety.

Another operation may come up which requires the utilization of space directly above and at the center of the lattice or reactor core assembly 11. This space may be occupied by rods, guide or rack extensions or rod supports 39. Once again the novel unitized method of controlling nuclear reactions permits a change in rod position which will result in a clear central space. The motor package mounting plate 27, in the form shown, is predrilled, FIGURE 3. The holes 31 are so arranged that a standard mounting is available for every point over the core lattice 11. A standard drive unit 29 can pick up its mounting hole 31 directly over any element and be bolted at a flange 32 connection. Since the special fuel element 35 and rod guide 37 comprise an integral unit, it may be placed in any location in the lattice 11. Therefore, after necessary precautions with regard to safety have been taken, the control rods and supports 39, special elements 35, and their guides 37 are moved to the corners of the lattice 11, for example, and the ambulatory motor packages 29 are unbolted at the flanges 32 and moved to new locations. Since the electrical connections are still intact the new requirement has been met with almost no effort. A great advantage of unitized components is that flexibility inherent in this approach allows a wide range of operations and also makes possible future experimental arrangements for research not yet conceived.

Figure 5:
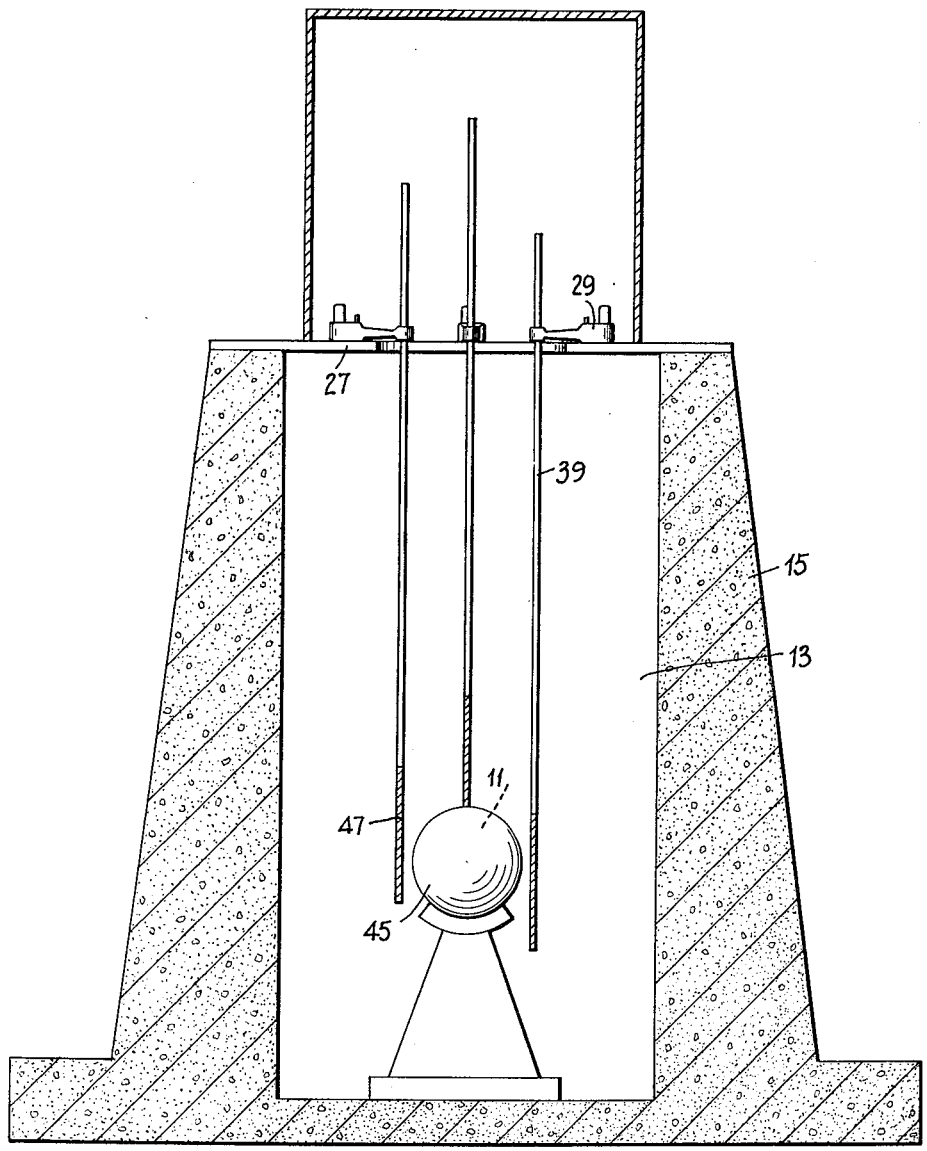
FIGURE 5 is a diagrammatic cross sectional view of a homogeneous water boiler type reactor.

The foregoing description of a swimming pool reactor is, of course, only one possible way of utilizing this invention. This invention is equally applicable to a homogeneous, water boiler type, nuclear reactor shown in FIGURE 5. In the water boiler type reactor, the core comprises a solution of a uranium salt in water contained in a sealed vessel 45, which is supported in the shielding chamber 13. Control rods 47 which absorb neutrons are suspended around this vessel in the same way as control rods and supports 39 are suspended in a heterogeneous type reactor such as shown in FIGURE 1. Control rods are moved by driving means 29 past the surface of the homegenous reactor nuclear core vessel 45, either around the vessel or through special control rod slots formed in the surface of the vessel. The movement of these control rods is in principle substantially the same as that of control rods in the described heterogeneous type reactor. The core assumes a more permanent character than that shown in the principal example where flexible design allows the shifting of core fuel elements 43 in conjunction with rearrangements of the control rods and supports 39.

The invention is also easily adapted to a sealed system type nuclear reactor such as may be convenient for a power producing system. In a sealed system, the control mechanisms and core 11 are sealed from the outside, such that all radioactive fluid is contained within a sealed structure. When this invention is applied to a sealed system, the entire guide mechanism package as well as the control rods themselves must be contained within a sealed enclosure to prevent the escape of radioactive material. Even in a sealed system, control components can be easily substituted for defective components or new, additional components can be put into a system. Here again it is convenient to be able to substitute standard components.

There has thus been described the application of a system of control mechanisms to various kinds of nuclear reactors and a method of controlling nuclear reactions. Interchangeable control rods and control rod driving mechanisms are flexibly mounted around a reactor core so that they are easily relocated, removed and substituted for, or added to. Convenient spacial rearrangement of control rods is provided for. In one embodiment the number, size and location of fuel elements is also adjustable in combination with control rod relocation. This invention is adapted to use in a large number of kinds of nuclear reactors. It provides a flexible system of growth so that nuclear reactors can be modified to meet changing experimental needs. By means of this invention costly rearrangements and innovations in structure are avoided. By use of the unitized system of reactor con-

What is claimed is:

1. The method of arranging a swimming pool reactor having a system of control rod drive packages which can be readily rearranged as to relative locations and speeds of control with respect to immersed reactor core elements including the steps of:
   (a) providing a core supporting grid located deep in the pool and having a pattern including a multiplicity of identical core-element supporting stations shaped to receive and locate in definite mutually-parallel positions plural clustered similarly-shaped core elements including fuel elements, at least some of said core elements having a verticle bore receiving a control rod, all of which control rods extend upwardly in parallel relationship from elements supported on said grid;
   (b) providing plural control-rod drive packages having interchangeable motor and gear means connected to actuate the reciprocable rod drives, and the packages having standardized housings with similarly drilled mounting flanges located in standardized locations offset from the associated reciprocable rod-drive and in a plane normal thereto;
   (c) rigidly fixing a drive package mounting plate in a position above the pool and normal to said parallel control rods, and providing the mounting plate with a multiplicity of standardized drive-package anchorage positions drilled to register with the drilled flanges of any rod drive package, and placing the anchorage positions in a definite pattern such that whenever a drive package is bolted in a selected position its reciprocable rod drive will be in alignment with a corresponding core supporting station of said grid;
   (d) mounting a lattice of core elements clustered in selected stations on said grid with control rods located at certain stations;
   (e) mounting a rod-drive package at each anchorage position which corresponds with one of said certain stations, and selecting and installing therein the motor and gear means necessary to drive the associated control rod at a rate suitable to its intended control sensitivity; and
   (f) coupling each control rod with the reciprocable rod drive with which it aligns.

2. The method of arranging a swimming pool reactor having a system of control rod drive packages which can be readily rearranged as to relative locations and speeds of control with respect to immersed reactor core elements including the steps of:
   (a) providing a core and a core supporting grid located deep in the pool and having a pattern including a multiplicity of identical core-element supporting stations shaped to receive and locate in definite mutually-parallel positions plural clustered similarly-shaped core elements including fuel elements, said core having vertical openings for receiving control rods, all of which control rods extend upwardly in parallel relationship from the core supported on said grid;
   (b) providing plural control-rod drive packages having interchangeable motor and gear means connected to actuate reciprocable rod drives, and the packages having standardized housings with mounting means which are all similar to each other and located in standardized locations offset from the associated reciprocable rod-drive and in a plane normal thereto;
   (c) rigidly fixing a drive package mounting plate in a position above the pool and normal to said parallel control rods, and providing the mounting plate with a multiplicity of standardized drive-package anchorage positions with holes shaped to cooperate with one of said mounting means on a rod drive package, and placing the anchorage positions in a definite pattern such that whenever a drive package is anchored in a selected position its reciprocable rod drive will be in register with a corresponding core supporting station of said grid;
   (d) mounting a lattice of core elements clustered in selected stations on said grid with control rods located at certain stations;
   (e) mounting a rod-drive package at an anchorage position which corresponds with one of said selected stations, and selecting and installing therein the motor and gear means necessary to drive the associated control rod at a rate suitable to its intended control sensitivity; and
   (f) coupling each control rod with the reciprocable rod drive with which it is in register.

3. In a nuclear reactor employing core configurations made up of multiple similarly shaped fuel elements, a certain critical number of which are required in a selected configuration to sustain a nuclear reaction, and said reactor including control rods extending into bores in fuel elements for controlling said reaction and each rod being supported for reciprocation with respect thereto, said reactor including a grid having a pattern of fuel-element mounting locations greatly exceeding said critical number and each shaped to receive and support a fuel-element in a precise location, and said reactor including a mounting plate disposed opposite to and spaced from said core supporting grid, the improvement comprising:
   (a) a multiplicity of interchangeable control rod reciprocating drive units each including a housing supporting a reciprocable rod support and a motor to drive the latter, the housings of all the units having mounting flanges with holes therethrough in standardized locations precisely oriented with respect to said reciprocable rod support;
   (b) said drive mounting plate having a number of identical mounting stations, each including a set of holes in standardized locations and said mounting stations being arranged in a pattern such that when aligned with the holes of a drive package flange mounted thereon the reciprocable rod support will be in precise alignment with respect to a fuel element location on said grid; and
   (c) releasable securing means passed through the aligned holes for securing motor drive package mounting means in selected mounting stations of said plate.

4. A control system for a swimming pool reactor comprising in combination:
   (a) a nuclear core support immersed in water and disposed transversely of an upwardly extending axis and having a pattern of possible fuel element supporting positions in excess of the number of elements required to sustain a nuclear reaction and said positions being all shaped the same to support complementarily shaped fuel element ends;
   (b) fuel elements occupying at least some of said positions and supported in mutually parallel upright positions thereby, some of the elements having bores therein disposed parallel to said axis;
   (c) plural control rods each disposed parallel with the axis and with one end extending into a bore of a fuel element;
   (d) a mounting plate spaced along said axis at a distance from said core support and rigidly fixed opposite thereto, said mounting plate having a multiplicity of identical fastener stations each having plural standardized mounting holes occupying a definite position of registry with respect to a different one of said fuel element supporting positions;
   (e) plural similar interchangeable rod-drive units each having a reciprocable rod support connected with and supporting a control rod for reciprocating the latter with respect to the associated fuel element, said drive units each comprising a unitary integral drive package including motor means coupled to drive transmission means connected to raise and lower said reciprocable rod support and said drive units all having mounting flanges with standardized mounting holes located to cooperate with the holes in any one of said fastener stations on said plate for positively locating the drive unit thereon to bring the associated control rod support into registry with the bore in a corresponding fuel element on the core support; and (f) releasable fastener means transfixing aligned holes in the fastener stations and the flanges.

5. In a control system as set forth in claim 4, each drive unit housing including standardized motor mounting means and standardized transmission mounting means for interchangeably receiving similarly shaped motors and transmissions having different drive characteristics.

6. In a nuclear reactor employing core configurations made up of multiple similarly shaped fuel elements, a certain critical number of which is required in a selected configuration to sustain a nuclear reaction, and said reactor including control rods extending into openings among the core fuel elements for controlling said reaction and each rod being supported for reciprocation with respect thereto, said reactor including a grid having a pattern of fuel-element mounting locations greatly exceeding said critical number and each shaped to receive and support a fuel-element in a precise location, and said reactor including a mounting plate disposed opposite to and spaced from said core supporting grid, the improvement comprising:

(a) a multiplicity of interchangeable control rod reciprocating drive units each including a housing supporting a reciprocable rod support and a motor to drive the latter, the housings of all the units having first mounting means arranged in mutually standardized locations precisely oriented with respect to said reciprocable rod support;

(b) said drive mounting plate having a number of identical mounting stations, each including at least one hole shaped to cooperate with said first mounting means and disposed in standardized locations and said mounting stations being arranged in a pattern such that, when engaged with said first mounting means of a drive package so that said package is mounted thereon, the reciprocable rod support will be in precise register with an opening in the core located on said grid; and (c) releasable securing means for securing each motor drive package mounting means to a selected mounting station of said plate.

7. In a control system as set forth in claim 6, each drive unit housing including standardized motor mounting means and standardized transmission mounting means for interchangeably receiving similarly shaped motors and transmissions having different drive characteristics.

8. A control system for a swimming pool reactor comprising in combination:

(a) a nuclear core support immersed in water and disposed transversely of an upwardly extending axis and having a pattern of possible fuel element supporting positions in excess of the number of elements required to sustain a nuclear reaction and said positions being all shaped the same to support complementarily shaped fuel element ends;

(b) fuel elements occupying at least some of said positions and supported in mutually parallel upright positions thereby to form a core, said core having openings among the fuel elements therein disposed parallel to said axis;

(c) plural control rods each disposed parallel with the axis and with one end extending into one of said openings;

(d) a mounting plate spaced along said axis at a distance from said core support and rigidly fixed opposite thereto, said mounting plate having a multiplicity of identical fastener stations each having at least one standardized mounting hole occupying a definite position of registry with respect to any one of said fuel element supporting positions;

(e) plural similar interchangeable rod-drive units each having a reciprocable rod support connected with and supporting a control rod for reciprocating the latter with respect to the core, said drive units each comprising a unitary integral drive package including motor means coupled to drive transmission means connected to raise and lower said reciprocable rod support, and said drive units all having standarized mounting means located to cooperate with the mounting holes in any one of said fastener stations on said plate for positively locating the drive unit thereon to bring the associated control rod support into registry with an opening in the core; and (f) releasable fastener means for securing the drive units to the mounting plate at selected stations.

9. In a control system as set forth in claim 8, each drive unit housing including standardized motor mounting means and standardized transmission mounting means for interchangeably receiving similarly shaped motors and transmissions having different drive characteristics.

References Cited in the file of this patent

AECD–3425, AEC Document, April 15, 1950, pp. 1–7, 10, and 13.

Nucleonics, November 1952, pp. 56–60, vol. 10, No. 11.

Nuclear Engineering, CEP Symposium Series, vol. 50, No. 11, 1954, pp. 203–212.